United States Patent
Kim et al.

(10) Patent No.: US 10,945,116 B2
(45) Date of Patent: Mar. 9, 2021

(54) INTER-VEHICLE COMMUNICATION SYSTEM FOR BROADCASTING A MESSAGE BASED UPON EMERGENCY CONDITIONS

(71) Applicants: HYUNDAI MOTOR COMPANY, Seoul (KR); KIA MOTORS CORPORATION, Seoul (KR)

(72) Inventors: Ju Won Kim, Anyang-si (KR); Joon Young Kim, Seongnam-si (KR); Dong Uk Kim, Incheon (KR); Jeong Won Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/597,756

(22) Filed: Oct. 9, 2019

(65) Prior Publication Data

US 2020/0196126 A1 Jun. 18, 2020

(30) Foreign Application Priority Data

Dec. 13, 2018 (KR) ........................ 10-2018-0161241

(51) Int. Cl.
*H04W 4/90* (2018.01)
*H04W 4/46* (2018.01)
*H04W 4/48* (2018.01)
*H04W 4/06* (2009.01)

(52) U.S. Cl.
CPC ............... *H04W 4/90* (2018.02); *H04W 4/06* (2013.01); *H04W 4/46* (2018.02); *H04W 4/48* (2018.02)

(58) Field of Classification Search
CPC .......... H04W 4/40; H04W 4/42; H04W 4/44; H04W 4/06; H04W 4/46; H04W 4/48; H04W 4/90; G06K 9/00845; H04L 67/12
USPC ...... 455/404.1, 41.1, 41.2, 517, 569.2, 575.9
See application file for complete search history.

(56) References Cited

U.S. PATENT DOCUMENTS

| | | | |
|---|---|---|---|
| 2015/0266377 A1* | 9/2015 | Hampiholi | H04M 1/72552 455/466 |
| 2017/0101054 A1* | 4/2017 | Dusane | G08G 1/205 |
| 2019/0066496 A1* | 2/2019 | Choi | H04W 4/12 |

* cited by examiner

*Primary Examiner* — Philip Sobutka
(74) *Attorney, Agent, or Firm* — Morgan, Lewis & Bockius LLP

(57) ABSTRACT

A method of controlling an inter-vehicle communication system includes: monitoring a current situation based on at least one piece of input information; determining whether the current situation corresponds to an emergency condition; preparing a message corresponding to the emergency condition upon determining that the current situation corresponds to the emergency condition; and broadcasting the prepared message to at least one neighboring vehicle.

17 Claims, 16 Drawing Sheets

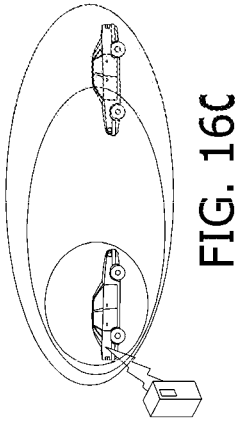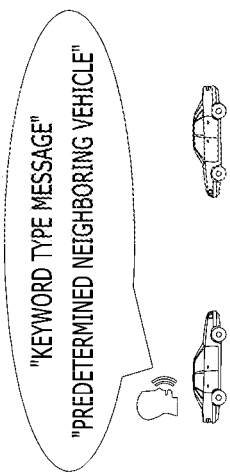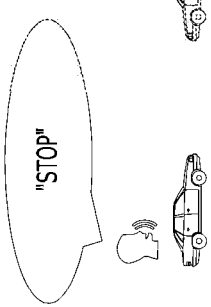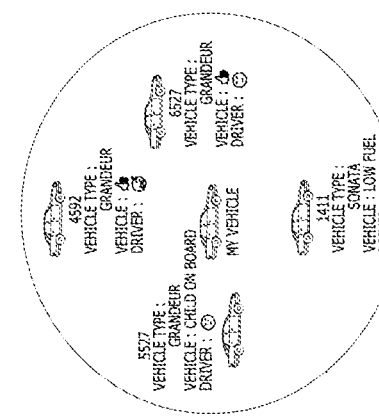

INTER-VEHICLE COMMUNICATION SYSTEM FOR BROADCASTING A MESSAGE BASED UPON EMERGENCY CONDITIONS

CROSS REFERENCE TO RELATED APPLICATION

This application claims the benefit of Korean Patent Application No. 10-2018-0161241, filed on Dec. 13, 2018 in the Korean Intellectual Property Office, the entirety of which is hereby incorporated by reference herein.

TECHNICAL FIELD

The present disclosure relates to an inter-vehicle communication system capable of transmitting a message or voice between vehicles, and a method of controlling the same.

BACKGROUND

Recent vehicles include various electronic and communication apparatuses and thus acquire information from the inside or outside of the vehicles and provide various services based on the information. However, despite such technological development, drivers and/or drivers of neighboring vehicles still honk their horns, and other communication units other than headlamps or hand signals are not available.

Accordingly, there is a need for a method of easily transmitting and receiving a message to and from drivers of neighboring vehicles without affecting traveling of vehicles as much as possible.

SUMMARY

Accordingly, the present disclosure is directed to an inter-vehicle communication system and a method of controlling the same that substantially obviate one or more problems due to limitations and disadvantages of the related art.

An object of the present disclosure is to provide an inter-vehicle communication system capable of conveniently transmitting a message to drivers of neighboring vehicles, and a method of controlling the same.

In particular, another object of the present disclosure is to provide an inter-vehicle communication system capable of transmitting a message in a form and content suitable for a situation, and a method of controlling the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling an inter-vehicle communication system includes: monitoring a current situation based on at least one piece of input information; determining whether the current situation corresponds to an emergency condition; preparing a first message corresponding to the emergency condition upon determining that the current situation corresponds to the emergency condition; and broadcasting the first message to at least one neighboring vehicle.

In another aspect of the present disclosure, a vehicle includes: an information input unit configured to acquire at least one piece of input image; and an inter-vehicle communication system configured to monitor a current situation based on the at least one piece of input information, to determine whether the current situation corresponds to an emergency condition, to prepare a first message corresponding to the emergency condition upon determining that the current situation corresponds to the emergency condition, and to broadcast the first message to at least one neighboring vehicle.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 16A-16F are views showing an example of a situation in which a keyword type selective message according to an exemplary embodiment of the present disclosure is transmitted.

DETAILED DESCRIPTION

Figure 1:
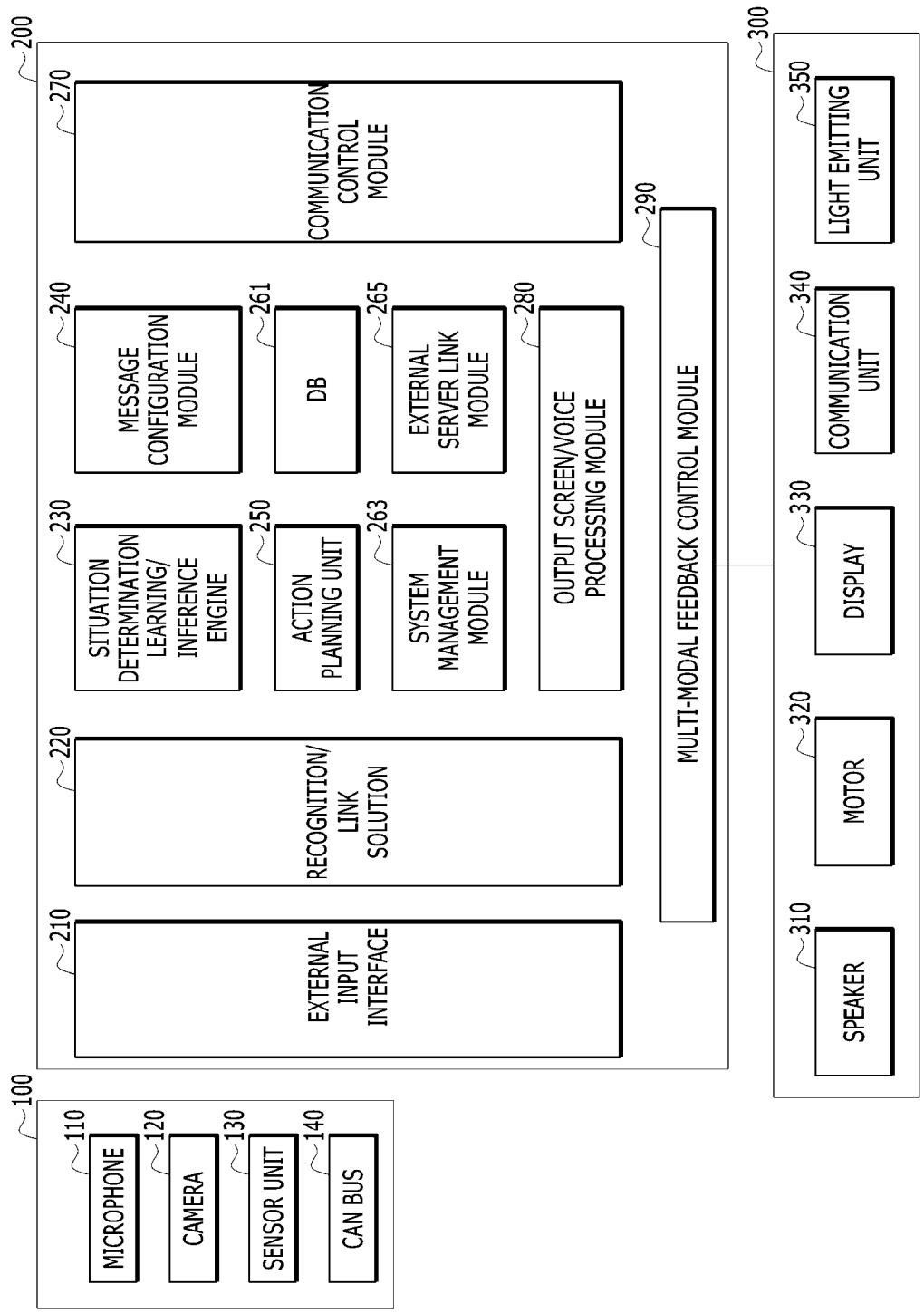
FIG. 1 is a block diagram showing an example of the structure of a vehicle according to an exemplary embodiment of the present disclosure.

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

In the entire specification, when a certain portion "includes" a certain component, this indicates that other components are not excluded, but may be further included unless specially described. The same reference numbers will be used throughout the drawings to refer to the same or like parts.

In an exemplary embodiment of the present disclosure, an inter-vehicle communication system capable of transmitting and receiving a message using information on a driver, a vehicle state and neighboring vehicles is proposed.

First, the structure of a vehicle applicable to embodiments of the present disclosure will be described with reference to FIG. 1. FIG. 1 is a block diagram showing an example of the structure of a vehicle according to an exemplary embodiment of the present disclosure.

Referring to FIG. 1, the vehicle according to an exemplary embodiment may include an information input unit 100, an inter-vehicle communication system 200, and an information output unit 300.

The information input unit 100 may include a microphone 110 for receiving sound indoors, a camera 120 for acquiring an internal/external image of the vehicle, a sensor unit 130 for detecting various operation states of the vehicle, and a communication network for communicating with another controller of the vehicle, e.g., a controller area network (CAN) bus. This is just an example and any units capable of acquiring information related to a driver and neighboring vehicles may be used.

The information output unit 300 may previously output a message to be transmitted from the inter-vehicle communication system 200 to at least one of neighboring vehicles before selection or transmission and perform a function for outputting a message from a neighboring vehicle. To this end, the information output unit 300 may include at least one of a speaker 310 for outputting sound such as warning sound or a voice message, a motor 320 for controlling motion of the information output unit 300, a display 330 for visually outputting vehicle state and message related information, a communication unit 340 for exchanging data with the inter-vehicle communication system, or a light emitting unit 350 for visually outputting state information through light emission. The display 330 may be a touchscreen and, in this case, may function as an input unit. The detailed form of the information output unit 300 will be described below with reference to FIGS. 2A-2E.

The inter-vehicle communication system 200 according to an exemplary embodiment may select or recommend a message suitable for a situation to a user based on information acquired through the information input unit 100, a voice command of a driver, or a command input through operation of an operation system and transmit a text message or a voice message to a vehicle corresponding to a transmission object according to user's decision or automatically. Hereinafter, the components of the inter-vehicle communication system 200 will be described in detail.

First, an external input interface 210 provides a connection interface between the information input unit 100 and the inter-vehicle communication system 200.

A recognition/link solution 220 is an engine for converting data (e.g., raw data) acquired from each component of the information input unit 100 into data necessary to determine a situation and may include at least one of a video/audio/emotion recognition engine, a sensor link module or a CAN link module.

A situation determination learning/inference engine 230 refers to a learning/inference engine used to determine a current vehicle situation and state based on data received from the recognition/link solution 220.

A message configuration module 240 corresponds to a core module for configuring a message to be transmitted to another vehicle based on at least one of data directly input by the driver and the determined vehicle/driver state.

An action planning unit 250 corresponds to a central branch processing module for establishing connection such that a message is configured and transmitted/received in a proper timing and manner using a result of situation determination of the situation determination learning/inference engine 230.

A database (DB) 261 may store a default message and a message set by the user.

A system management module 263 may manage the operation state of an internal module of the inter-vehicle communication system 200.

An external server link module 265 may control a process of requesting and receiving information on neighboring vehicles (position, vehicle number, vehicle type, vehicle state information, driver information, etc.) from an external server.

A communication control module may perform communication with neighboring vehicles according to a communication method such as broadcasting, multicasting and unicasting.

An output screen/voice processing module 280 corresponds to a content configuration module for outputting various output information such as neighboring vehicle information, a message or other information as audio or visual information.

In addition, a multi-modal feedback control module 290 may collectively control the information output unit 300 based on the processed value of the output screen/voice processing module 280.

Hereinafter, the appearance of the information output unit 300 according to the embodiment will be described with reference to FIGS. 2A-2E. FIGS. 2A-2E are views showing examples of the form of an information output unit applicable to exemplary embodiments of the present disclosure.

Figure 2A:
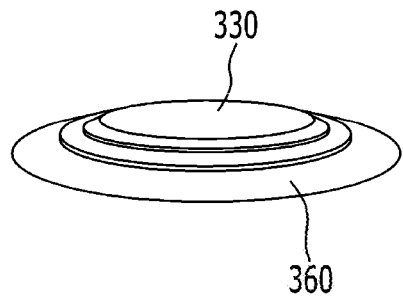
FIGS. 2A-2E are views showing examples of the form of an information output unit applicable to exemplary embodiments of the present disclosure.

First, referring to FIG. 2A, an interactive display is shown as an example of the information output unit 300 applicable to an exemplary embodiment of the present disclosure. The interactive display may not only perform an information transmission function for transmitting a message to be transmitted or a received message to a user but also support emotion simulation according to according to an image displayed on the display 330 and a driver's gesture. The interactive display may include a disc-shaped display 330 disposed on a disc-shaped base 360 and having a smaller diameter than the base.

Figure 2B:
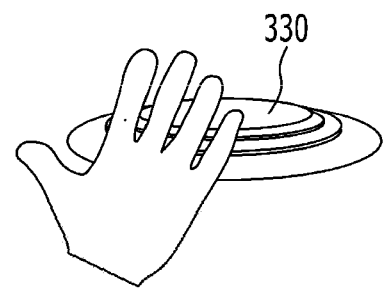
Figure 2C:
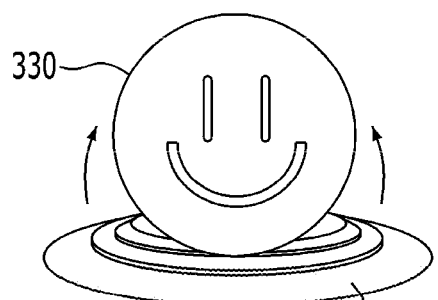
Figure 2D:
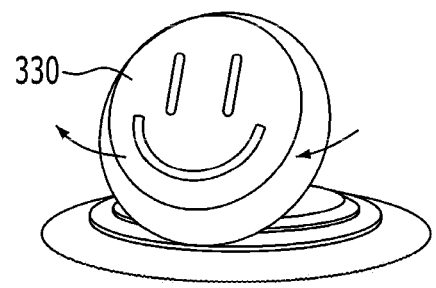
Figure 2E:
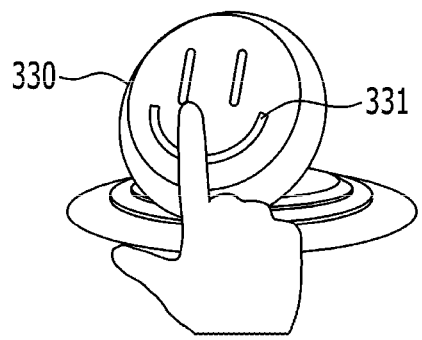

The display 330 is implemented as a circular touchscreen, and is accommodated in the form of being stacked on the base 360 in an off or sleep state and then wakes up as shown in FIG. 2C when the user makes a gesture of touching the display 330 as shown in FIG. 2B or upon determining that a driver rides in the vehicle. At this time, upon wakeup, the display 330 may be made stand to have a predetermined slope from the base 360 and display an image indicating an expression corresponding to the current state of the vehicle or the driver. In addition, as shown in FIG. 2D, the display 330 may rotate abut one axis of the base 360. For example, the display 330 may rotate to face the driver. In addition, as shown in FIG. 2E, when the finger of the user approaches the periphery of a mouth 331 displayed on the display 330, the sleep mode may be performed as shown in FIG. 2A.

The above-described shape of the information output unit 300 is an example and, if the interactive display is not provided, a display of a head unit may be used.

Next, the configurations of the message configuration module 240 and the output screen/voice processing module 280 will be described in greater detail with reference to FIGS. 3 and 4.

Figure 3:
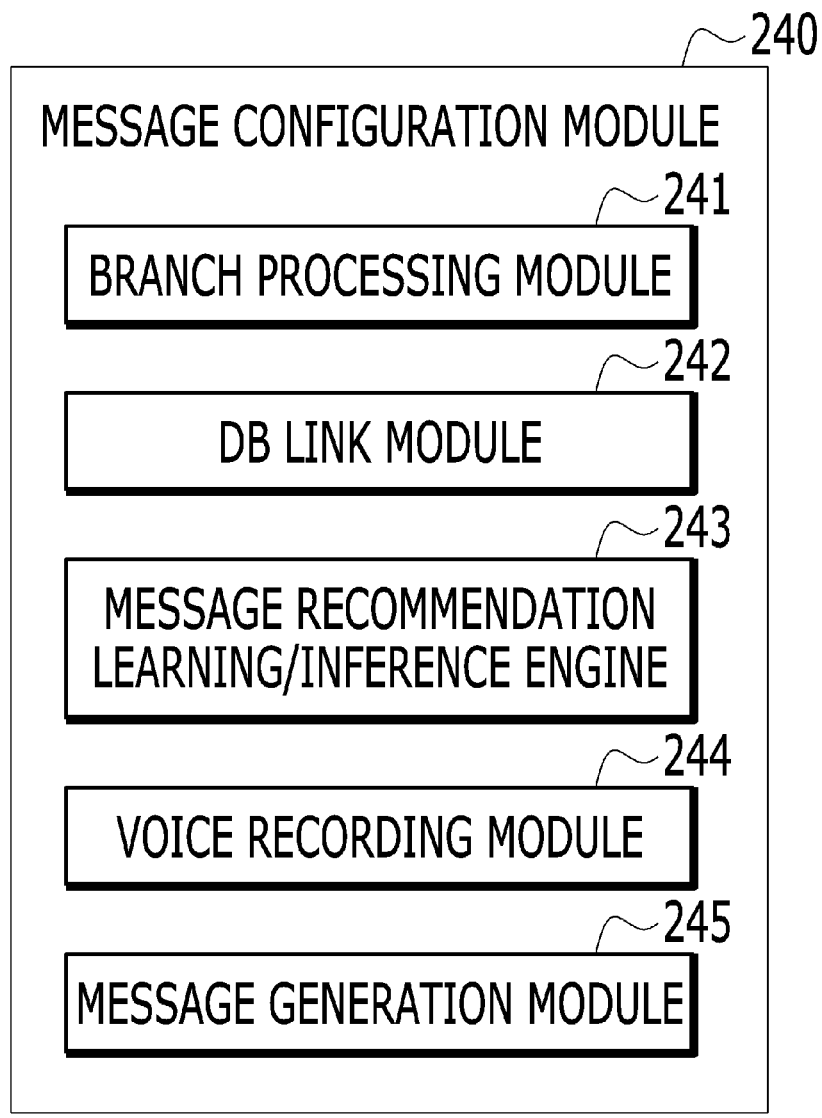
FIG. 3 is a view showing an example of the structure of a message configuration module according to an exemplary embodiment of the present disclosure.
Figure 4:
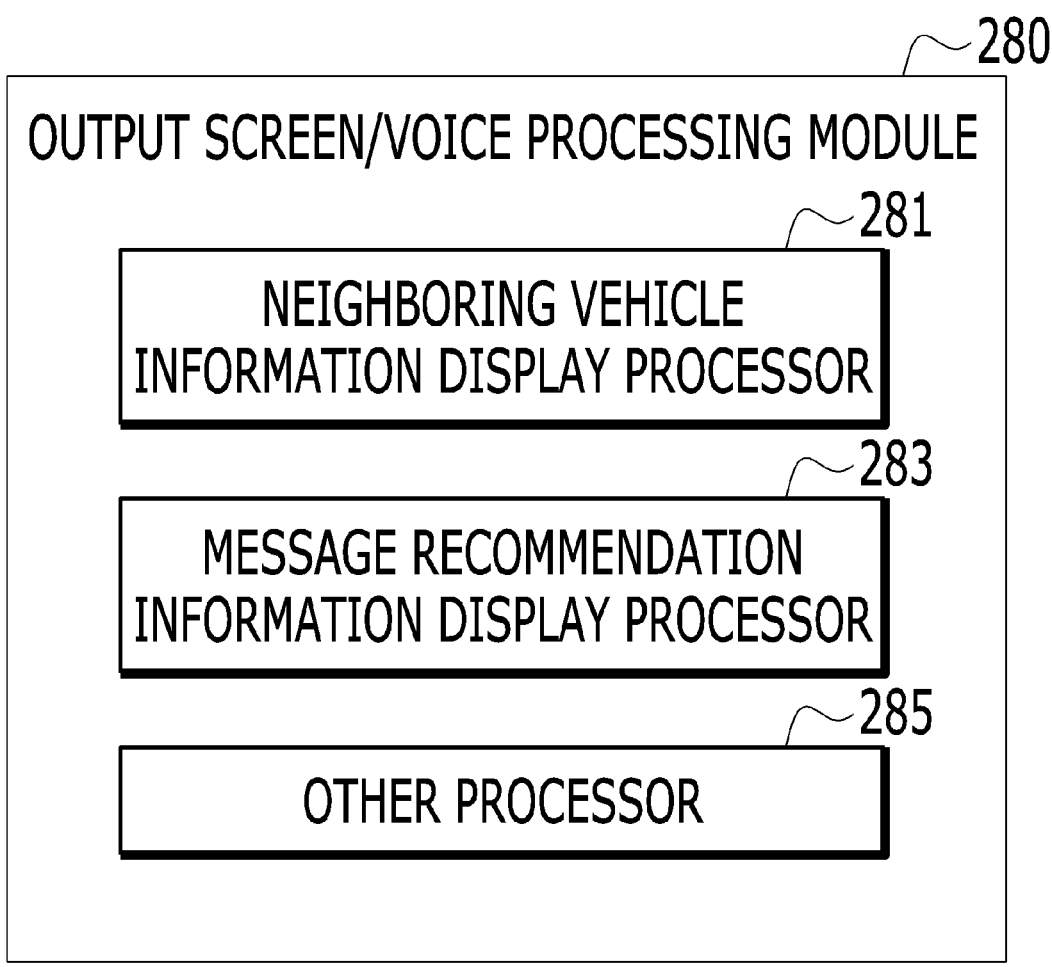
FIG. 4 is a view showing an example of the structure of an output screen/voice processing module according to an exemplary embodiment of the present disclosure.

FIG. 3 is a view showing an example of the structure of a message configuration module according to an exemplary embodiment of the present disclosure, and FIG. 4 is a view showing an example of the structure of an output screen/voice processing module according to an exemplary embodiment of the present disclosure.

First, referring to FIG. 3, the message configuration module 240 may include a branch processing module 241, a DB link module 242, a message recommendation learning/inference engine 243, a voice recording module 244 and a message generation module 245. As described above, the message configuration module generates and recommends a suitable message based on the current vehicle/driver state. The input data of this module 240 may be a current vehicle state, a driver state and user voice input data and the output data of the module may be text data corresponding to a message to be transmitted or sound data including recorded user voice.

The branch processing module 241 may correspond to a central processing unit of the message configuration module 240 for connecting modules at corresponding timing according to the type of a message to be transmitted.

The message DB link module 242 may perform a load and storage function of a message through linkage with the DB 261.

The message recommendation learning/inference engine 243 means a determination engine for prioritizing and recommending a frequently used message when a message is generated.

The voice recording module 244 may record the voice of the user.

The message generation module 245 may perform a function of loading data from the DB 261 and generating a message to be actually transmitted based on the result of the learning/inference engine 243.

Next, referring to FIG. 4, the output screen/voice processing module 280 may include a neighboring information display processor 281, a message recommendation information display processor 283 and the other processor 285. The output screen/voice processing module 280 may generate a user interface for allowing a user to select and transmit a message while directly viewing or listening to the message, use neighboring vehicle information (position, vehicle state, vehicle number, vehicle type and driver information), message information to be transmitted to another vehicle, information input by the user, etc. as input data, and use display data and voice data to be output through the information output unit 300 as output data.

The neighboring vehicle information display processor 281 processes a user interface including neighboring vehicle information such that the user easily recognizes information on neighboring vehicles, selects a vehicle to which a message will be transmitted, or confirms a message transmission vehicle when a message is transmitted using a multicasting or unicasting method or when a message is received.

The message recommendation information display processor 283 processes a user interface which allows the user to select and determine a listed phrase or an automatically recommended message and may display a voice-recorded phrase.

The other processor 285 may process a user interface other than the above-described two processors 281 and 283.

Figure 5:
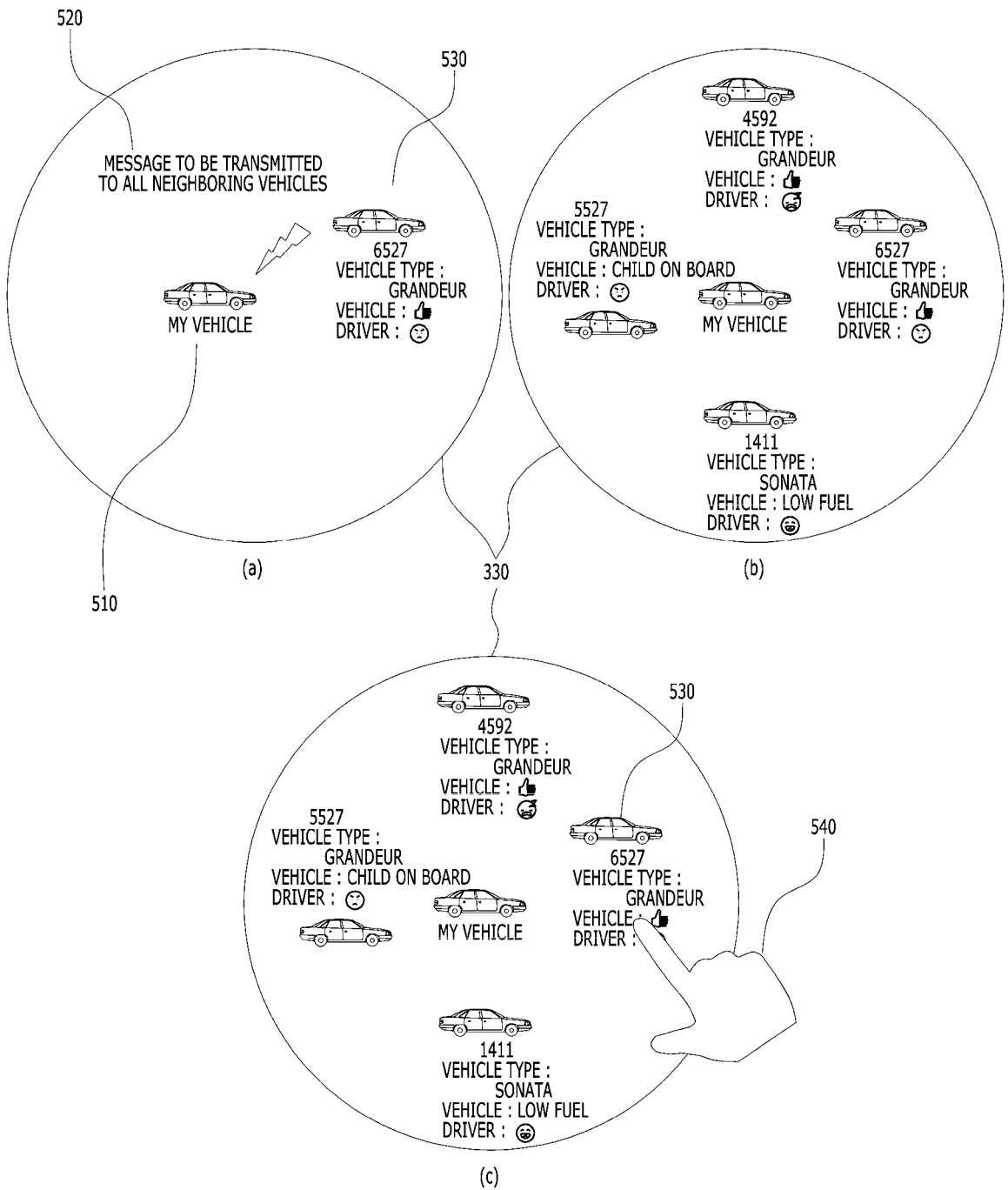
FIG. 5 is a view illustrating the form of a user interface processed by a neighboring vehicle information display processor according to an exemplary embodiment of the present disclosure.
Figure 6:
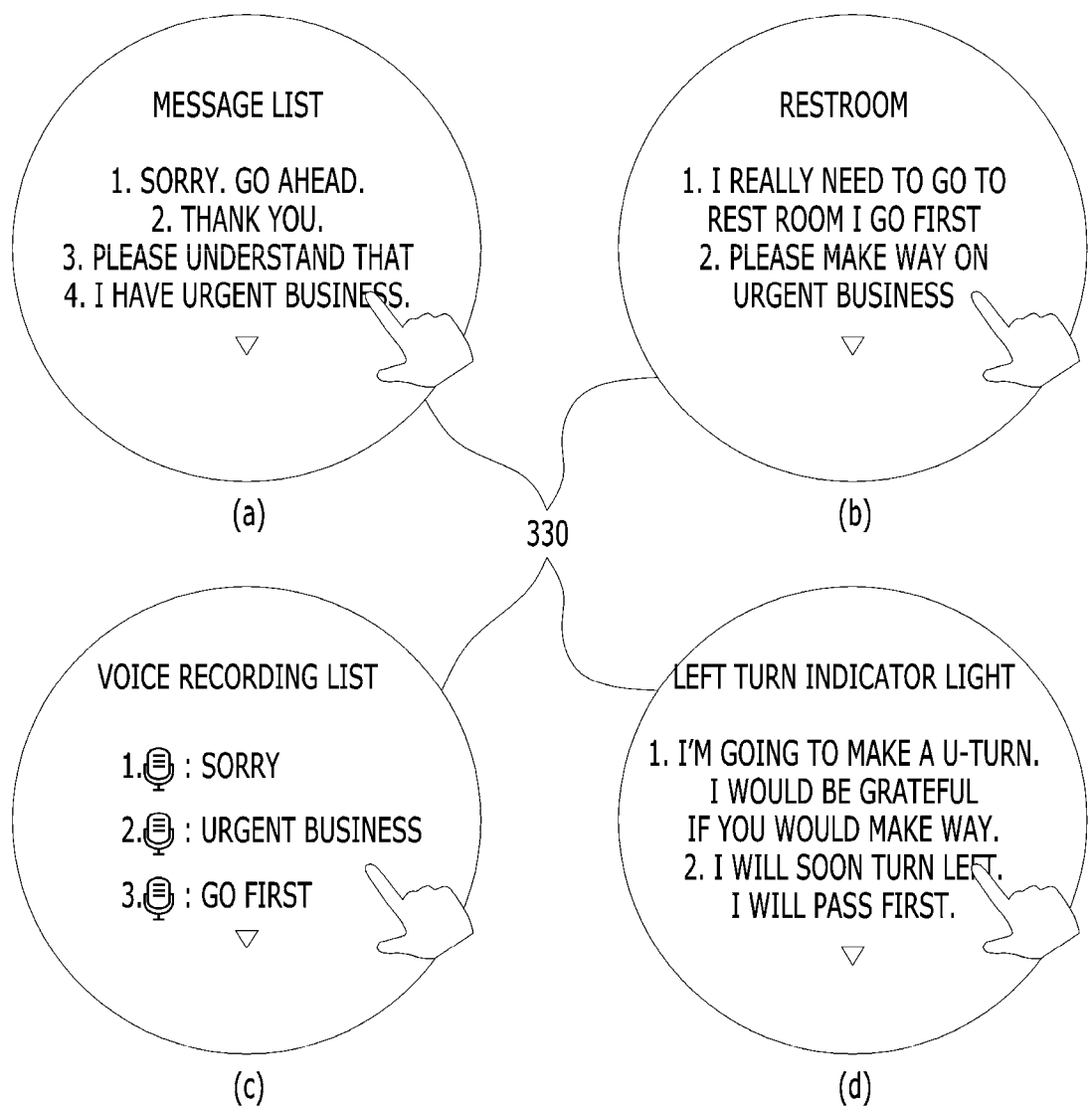
FIG. 6 is a view illustrating the form of a user interface processed by a message recommendation information display processor according to an exemplary embodiment of the present disclosure.
Figure 7:
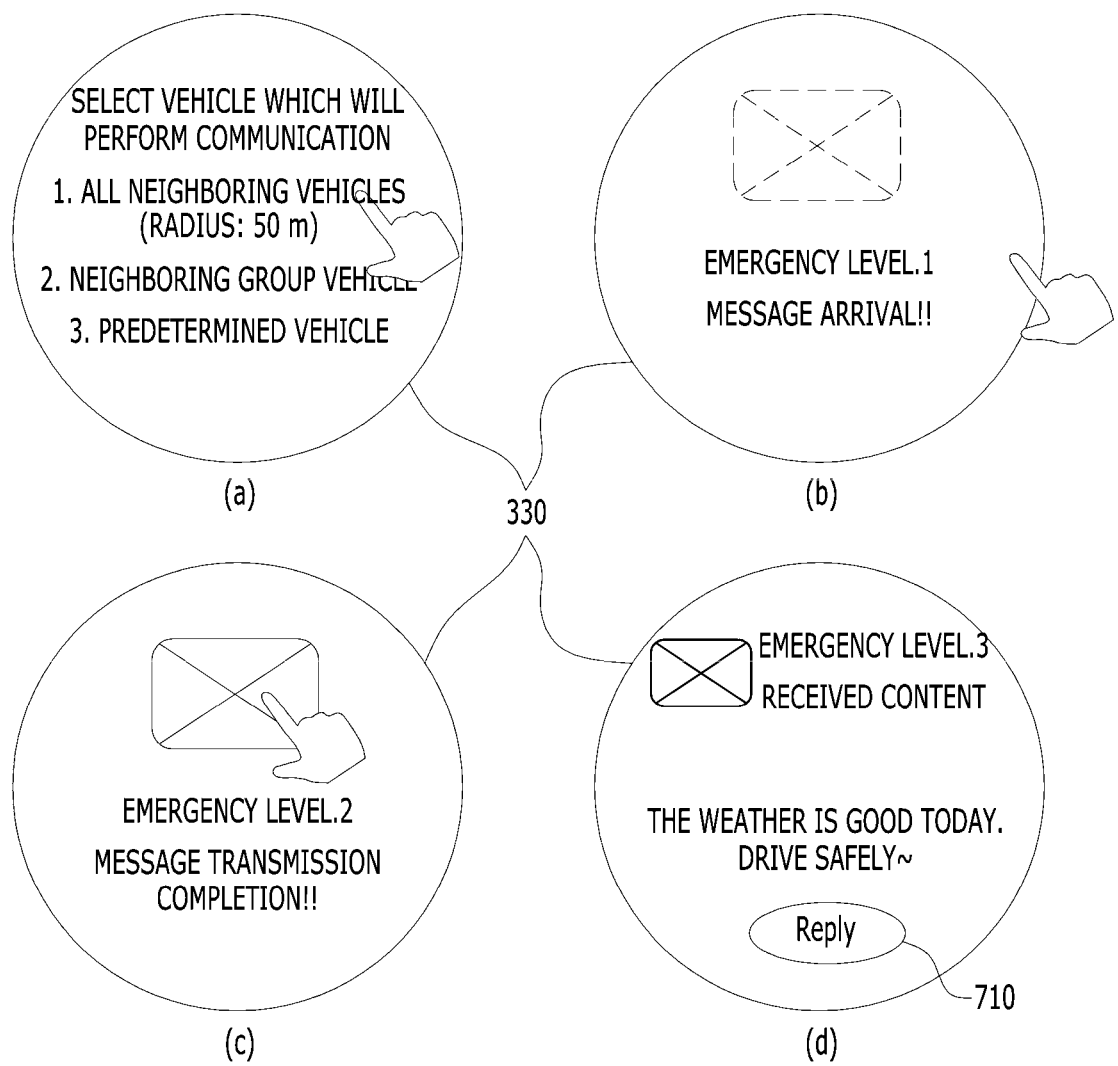
FIG. 7 is a view illustrating the form of a user interface processed by the other processor according to an exemplary embodiment of the present disclosure.

Hereinafter, the detailed form of the user interface processed by the components 281, 283 and 285 of the output screen/voice processing module 280 will be described with reference to FIGS. 5 to 7. In FIGS. 5 to 7, assume that the user interface processed by the processors 281, 283 and 285 is displayed on the circular touchscreen 330 described with reference to FIGS. 2A-2E.

FIG. 5 is a view illustrating the form of a user interface processed by a neighboring vehicle information display processor according to an exemplary embodiment of the present disclosure.

First, referring to (a) of FIG. 5, the display form of transmission vehicle information when a message is received is shown. Specifically, a display object corresponding to a subject vehicle 510 is displayed at the center of the user interface and information 530 on a neighboring vehicle which has transmitted a message is displayed around the display object. At this time, the information 530 on the neighboring vehicle which has transmitted the message may be displayed based on the actual vehicle position. To this end, the external server link module 265 may periodically transmit the position information thereof to a server and the server may transmit a relative neighboring vehicle position to the vehicle based on the position information of each vehicle.

The information 530 on the neighboring vehicle may include at least one of a 4-digit vehicle number, vehicle type information, vehicle state information and driver state information.

Referring to (b) of FIG. 5, the display form of neighboring vehicle information for allowing the user to select a vehicle, to which a message will be transmitted, before transmission of the message using a method other than broadcasting method (or unicasting or muticasting method) is shown. Similar to (a) of FIG. 5, information on neighboring vehicles, to which the message may be transmitted, may be displayed around the subject vehicle.

Referring to (c) of FIG. 5, in a state in which the user interface shown in (b) of FIG. 5, a neighboring vehicle 530 which desires to transmit the message may be selected through touch input 540 of the user.

FIG. 6 is a view illustrating the form of a user interface processed by a message recommendation information display processor according to an exemplary embodiment of the present disclosure.

Referring to (a) of FIG. 6, a list type message may be displayed. This may be output when a fixed type message of a selective message is transmitted.

Referring to (b) of FIG. 6, a keyword type message may be displayed. The keyword may be input through voice recognition and messages associated with the keyword may be recommended/output.

Referring to (c) of FIG. 6, a pre-recorded voice-recording-type message may be displayed. A newly recorded menu may be displayed together according to the situation.

Referring to (d) of FIG. 6, a situation message corresponding to a current situation (here, a situation in which a left turn indicator light is turned on) may be displayed.

In a state of displaying each message shown in FIG. 6, the user may perform touch input or input a message number by voice to select a message to be transmitted.

FIG. 7 is a view illustrating the form of a user interface processed by the other processor according to an exemplary embodiment of the present disclosure.

Referring to (a) of FIG. 7, a user interface for selecting a communication method is shown. In addition, (b) of FIG. 7 shows a user interface output in a state in which a message corresponding to Level 1 among message emergency levels arrives. In addition, (c) of FIG. 7 shows a user interface output in a state in which transmission of a message corresponding to Level 2 among the message emergency levels is completed. In addition, (d) of FIG. 7 shows a form in which the content of a message corresponding to Level 3 among the message emergency levels is displayed.

Hereinafter, the types of the messages according to the embodiment will be described with reference to Table 1 below.

TABLE 1

| Classification (user input) | Sub-classification (user input method) | Emergency | Communication method | Description | Example | Received message color |
|---|---|---|---|---|---|---|
| Automatic message | — | 1 | Broadcasting | When the vehicle cannot travel, a message is automatically transmitted without user confirmation: serious vehicle problem or abnormal driver state | "A serious problem has occurred in the engine of vehicle having a number of 5255. Go by the side" "The driver of the vehicle number of 5255 is unconscious. Help" | Red |
| | | 2 | | When the vehicle may travel but a situation affecting normal traveling occurs and the driver cannot confirm message transmission, the situation is automatically determined and a message is transmitted: unstable driver state + very urgent traveling purpose | "The vehicle having a number of 5255 is now going to XXX hospital on urgent business. I have very little time left. Please make way for me." | Orange |
| | | 3 | | When the vehicle may travel but a situation affecting normal traveling occurs, the situation is automatically determined and a message is transmitted after the user confirms message transmission: other vehicle problem, driving skill degree, driver fatigue and state, notification | "The driver of the vehicle having a number of 5255 started driving one week ago. Please understand that." "The vehicle having a number of 5255" travels | yellow |

TABLE 1-continued

| Classification (user input) | Sub-classification (user input method) | Emergency | Communication method | Description | Example | Received message color |
|---|---|---|---|---|---|---|
| Selective message | Fixed | — | Selected from broadcasting, multicasting and unicasting | according to destination/traveling pattern, vehicle passenger state The user directly selects and transmits a message from a previously stored message list through touch/voice. | at a constant speed because only 5% fuel remains. 1. Message type mode utterance: "fixed message" 2. Stored message list output 3. Select one from list "Go ahead" | gray |
| | Keyword | | | The user inputs a keyword by voice and then directly selects and transmits a message from an automatically recommended message list through touch/voice (the list is changed according to the situation/frequency). | 1. Message type mode utte rance: "keyword message" 2. Keyword utterance: "child" 3. Recommended message list output 4. Select one from list "Child on board. Please refrain from honking" | |
| | Conditional | | | When a specific condition occurs in the vehicle, the condition is recognized, a message list suitable for the condition is automatically recommended, and the user directly selects and transmits a message from the message list through touch/voice (the list is changed according to the situation/frequency). | 1. Message type mode utterance: "conditional message" 2. Conditional utterance: "full beam" 3. Recommended message list output 4. Select one from list "I'm going first because I'm busy. "Please make way" | |
| | Voice recorded | | | The actual voice of the user is recorded and transmitted and the user directly selects arid transmits a message (the list is changed according to the situation/frequency). | 1. Message type mode utterance: "recorded message" 2.voice recording 3. "~~" | |

Referring to Table 1, the message is roughly classified into an automatic message, the content of which is not directly selected by the user, and a selective message, the content of which is selected by the user, depending on user input. In addition, the automatic message may be sub-classified according to emergency and the selective message is classified into a fixed message, a keyword message, a conditional message and a voice-recorded message. The automatic message uses a broadcasting method as a basic communication method and the selective message allows user selection using any one of all communication methods. In a state of receiving a message, a received message may be displayed with a color which varies according to the automatic message and the selective message. The automatic message may have a color which varies according to emergency.

The description and examples of each message according to sub-classification (emergency and sub-classification method) are replaced with Table 1 above.

Figure 8:
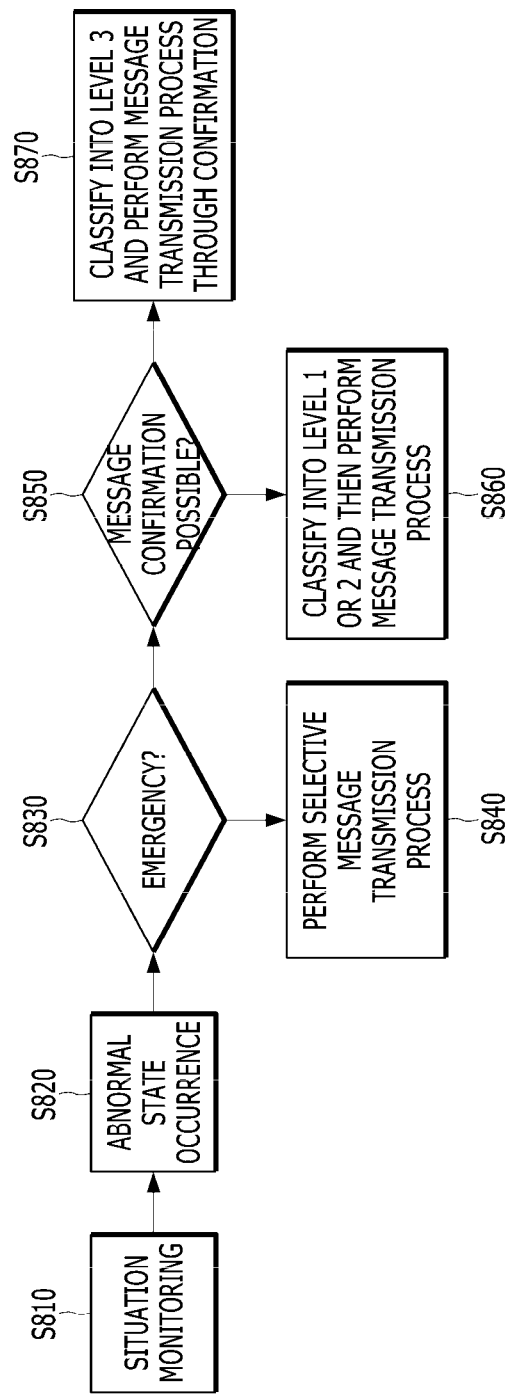
FIG. 8 is a flowchart illustrating an example of a process of determining a message type in an inter-vehicle communication system according to an exemplary embodiment of the present disclosure.

Next, a process of determining a message type in the inter-vehicle communication system 200 will be described with reference to FIG. 8. FIG. 8 is a flowchart illustrating an example of a process of determining a message type in an inter-vehicle communication system according to an exemplary embodiment of the present disclosure.

Referring to FIG. 8, upon determining that an abnormal situation occurs (S820) while the driver state and the vehicle state are monitored through the situation determination learning/inference engine 230 (S810), the inter-vehicle communication system 200 may determine whether the situation corresponds to an emergency state according to a predetermined criterion (S830). When the emergency situation does not occur (No of S830), a selective message transmission process may be performed (S840). In the selective message transmission process, since the user directly determines message content, this process may start when a wakeup voice command or user input corresponding thereto is received. Accordingly, when the emergency state does not occur, the driver state and the vehicle state may be monitored in a state of waiting for the wakeup command of the driver or user input corresponding thereto.

In contrast, when the emergency state occurs (Yes of S830), whether the driver can confirm the message may be determined (S850). Upon determining that the driver cannot confirm the message, the vehicle situation may be classified into Level 1 or Level 2 and a message transmission process without confirmation of the driver may be performed (S860). In contrast, when the driver can confirm the message (Yes of S850), the vehicle situation may be classified into Level 3 and a message transmission process with confirmation of the driver may be performed (S870).

Next, a message transmission process according to the message type will be described with reference to FIGS. 9 to 15.

Figure 9:
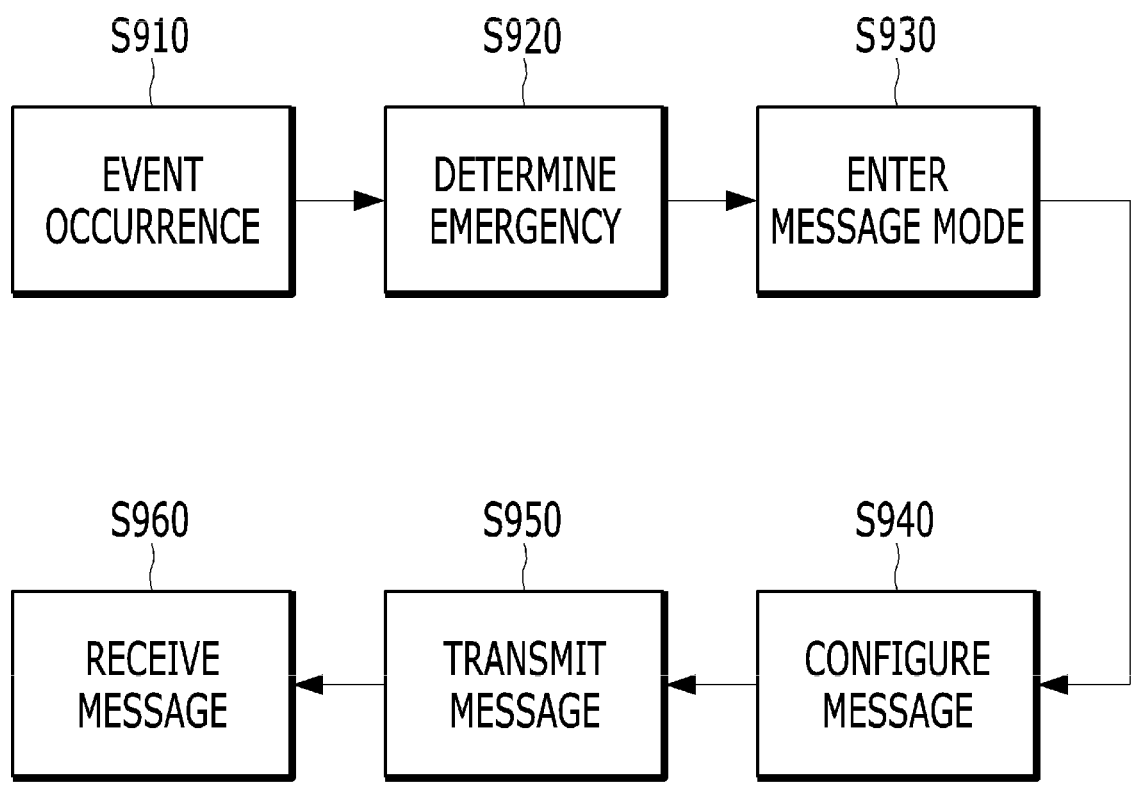
FIG. 9 is a flowchart illustrating an example of an automatic message transmission process corresponding to Level or Level 2 according to an exemplary embodiment of the present disclosure.

FIG. 9 is a flowchart illustrating an example of an automatic message transmission process corresponding to Level or Level 2 according to an exemplary embodiment of the present disclosure.

Referring to FIG. 9, when an event (e.g., driver unconsciousness, etc.) corresponding to Level 1 (e.g., driver unconsciousness, etc.) or Level 2 (e.g., a navigation destination is set to a hospital and sudden acceleration and sudden stop continuously occur) occurs (S910), the inter-vehicle communication system 200 may determine an emergency situation corresponding to Level 1 or Level 2 through the situation determination learning/inference engine 230 (S920).

Therefore, the inter-vehicle communication system 200 enters the automatic message mode (S930), configures a message corresponding to the event (S940), and broadcasts the message to neighboring vehicles (S950).

Therefore, the neighboring vehicles may receive the message corresponding to Level 1/2, confirm information on the vehicle, which has transmitted the message, and recognize the emergency situation of the vehicle (S960).

Figure 10:
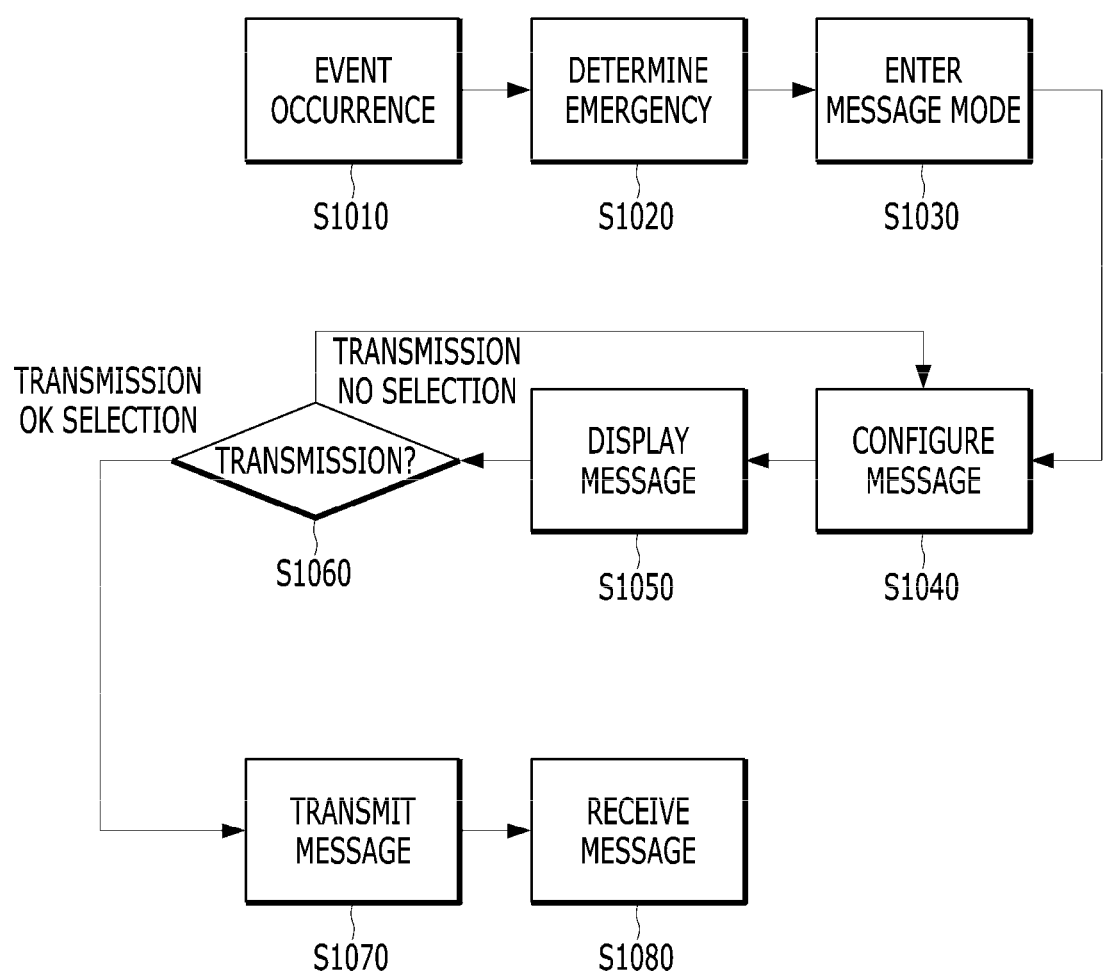
FIG. 10 is a flowchart illustrating an example of an automatic message transmission process corresponding to Level 3 according to an exemplary embodiment of the present disclosure.

FIG. 10 is a flowchart illustrating an example of an automatic message transmission process corresponding to Level 3 according to an exemplary embodiment of the present disclosure.

Referring to FIG. 10, when an event corresponding to Level 3 (e.g., driver fatigue increases due to continuous driving for a long time and lane departure and sudden stop continuously occur) occurs (S1010), the inter-vehicle communication system 200 may determine an emergency situation corresponding to Level 3 through the situation determination learning/inference engine 230 (S1020).

Therefore, the inter-vehicle communication system 200 enters the automatic message mode (S1030), configures a message corresponding to the event (S1040), and displays the configured message through the display 330 of the information output unit 300 (S1050). Therefore, the inter-vehicle communication system 200 may receive, from the user, confirmation as to whether the message displayed on the screen is transmitted without change and reconfigure a message when the user rejects transmission.

In contrast, when transmission is approved, the inter-vehicle communication system 200 may broadcast the configured message to neighboring vehicles (S1070).

Therefore, the neighboring vehicles may receive the message corresponding to Level 3, confirm information on the vehicle, which has transmitted the message, and recognize the situation of the vehicle (S1080).

Figure 11:
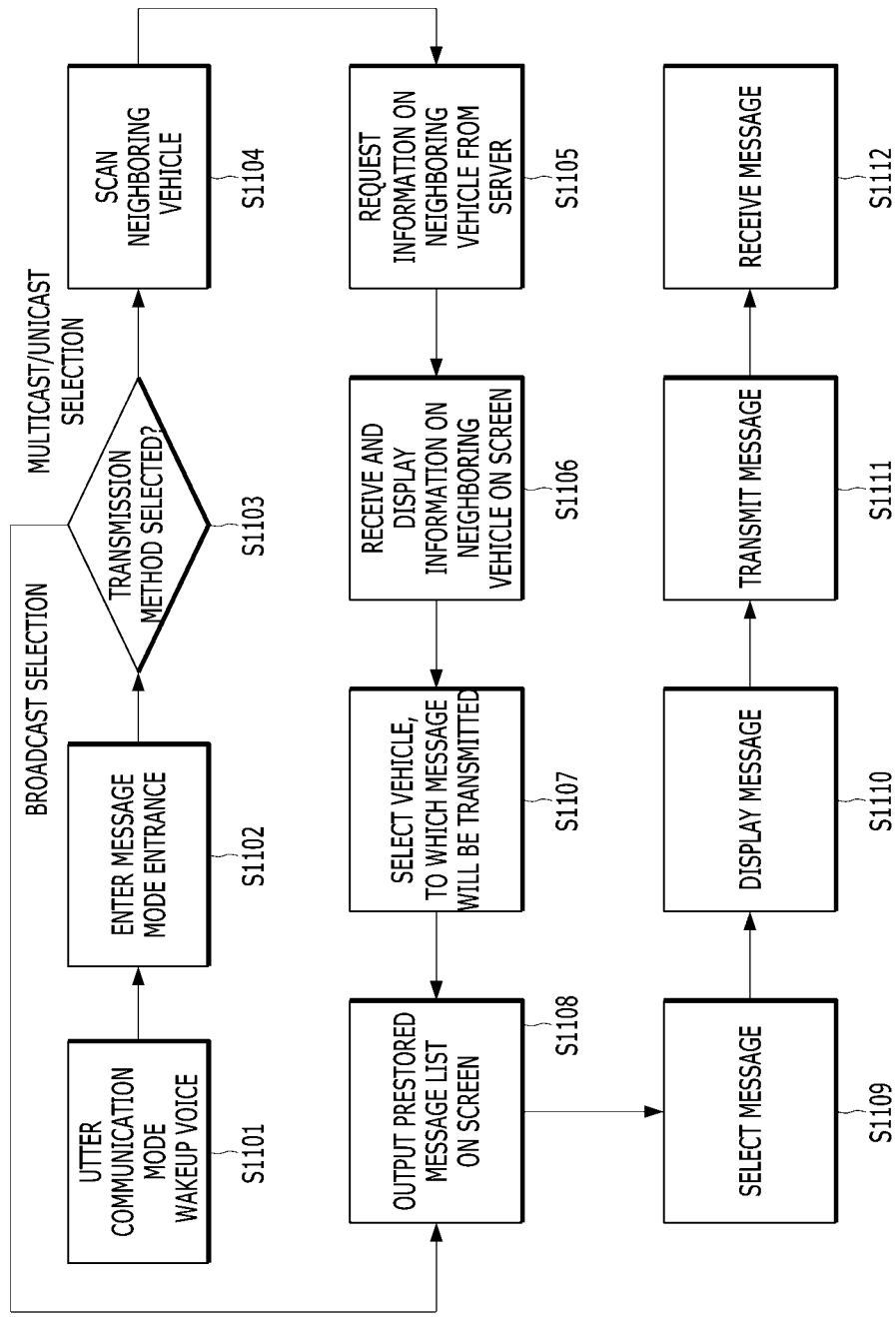
FIG. 11 is a flowchart illustrating an example of a fixed-type selective message transmission process according to an exemplary embodiment of the present disclosure.

FIG. 11 is a flowchart illustrating an example of a fixed-type selective message transmission process according to an exemplary embodiment of the present disclosure.

Referring to FIG. 11, first, the driver may utter a wakeup command through the microphone 110 (S1101), in order to transmit the fixed type selective message. At this time, the wakeup command may correspond to a message type (e.g., "fixed type message").

Therefore, the inter-vehicle communication system 200 may enter a fixed type selective message transmission mode (S1102), and output a user interface for receiving a transmission method through the display 330 of the information output unit 300 (S1103).

When the multicasting or unicasting method is selected, the neighboring vehicles may be scanned (S1104). Specifically, the inter-vehicle communication system 200 may request identification information from neighboring vehicles located within a predetermined radius (e.g., coverage of a V2V communication protocol) through the communication control module 270 or receive the identification information in response thereto or acquire identification information broadcast from the neighboring vehicles.

The inter-vehicle communication system 200 may transmit the acquired identification information of the neighboring vehicles to the server and request information on the neighboring vehicles (S1105).

When the information on the neighboring vehicles (e.g., a vehicle number, a vehicle type, a vehicle state, a driver state, etc.) is acquired from the server, the inter-vehicle communication system 200 may output the information on the neighboring vehicles through the display 330 of the information output unit 300 (S1106). At this time, the configuration of the user interface may be equal to the configuration shown in (b) of FIG. 5.

The driver may select a vehicle to which the message will be transmitted from the output information on the neighboring vehicles as shown in (c) of FIG. 5 (S1107).

When the broadcasting method is selected in step S1103 or when the vehicle to which the message will be transmitted is specified through S1104 to S1107, the inter-vehicle communication system 200 may load and display a prestored fixed type message list from the DB 261 (S1108). For example, the fixed type message list is shown in (a) of FIG. 6.

Here, when the driver selects a message to be transmitted (S1109), the full text of the selected message may be displayed through the display 330 of the information output unit 300 (S1110). When the driver determines message transmission (S1111), the selected message may be transmitted to the selected vehicle (S1112). Therefore, the neighboring vehicle to which the message will be transmitted may receive and confirm the message selected by the user.

Figure 12:
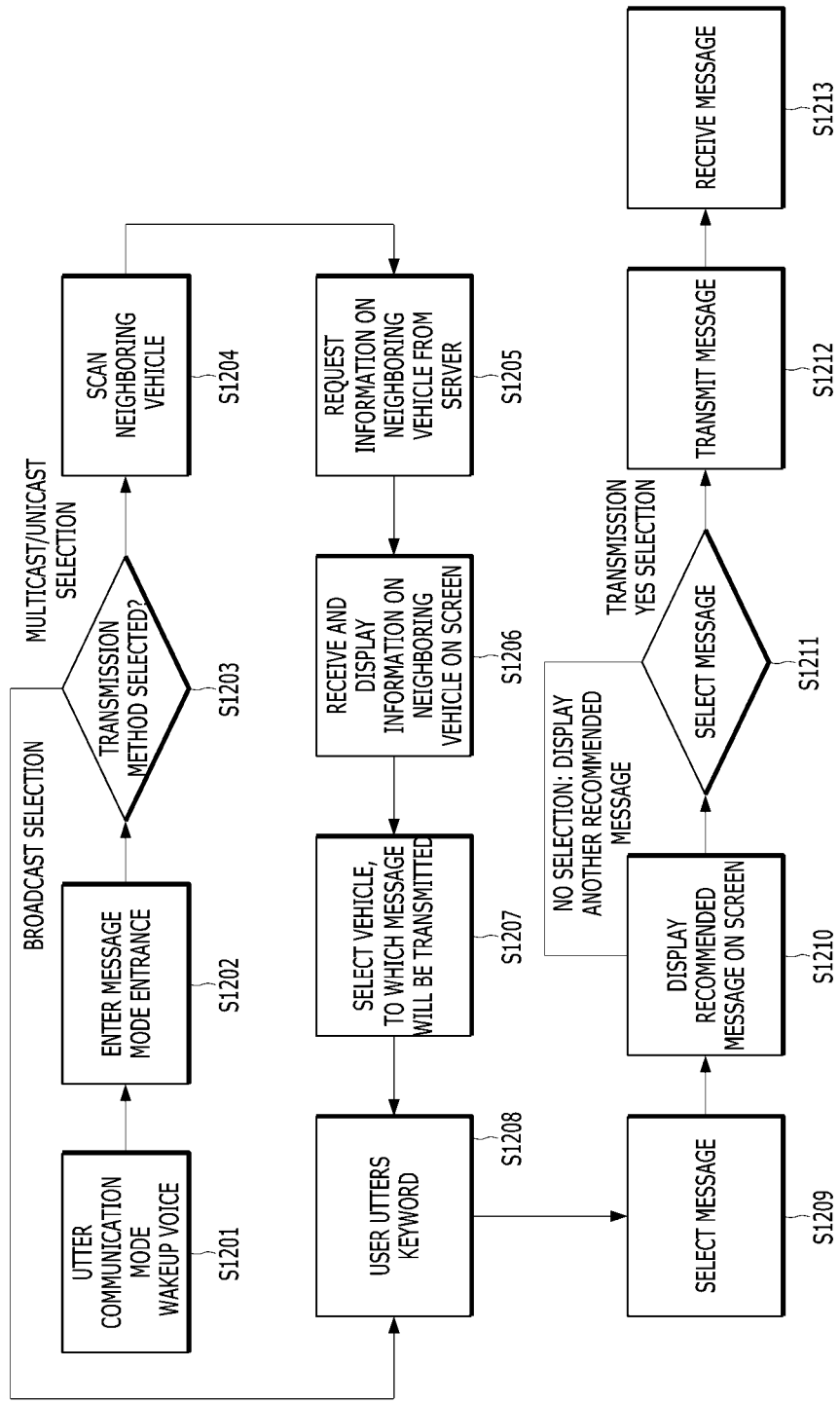
FIG. 12 is a flowchart illustrating an example of a keyword type selective message transmission process according to an exemplary embodiment of the present disclosure.

FIG. 12 is a flowchart illustrating an example of a keyword type selective message transmission process according to an exemplary embodiment of the present disclosure.

Steps S1201 to S1207 of FIG. 12 respectively correspond to steps S1101 to S1107 of FIG. 11 except that the wakeup command of step S1201 is of a keyword type (e.g., "keyword type message") and the message mode is a keyword type message mode in step S1202 and thus a repeated description will be omitted.

When the vehicle, to which the message will be transmitted, is specified, the user may utter a keyword (e.g., restroom) (S1208). Therefore, the message recommendation learning/inference engine 243 of the inter-vehicle communication system 200 may infer/determine a message phrase based on the keyword and determine a recommended message (S1209) and display the recommended message as shown in (b) of FIG. 6 (S1210).

The inter-vehicle communication system 200 may receive, from the user, confirmation as to whether the displayed message is transmitted (S1211), and display another recommended message when the driver rejects transmission (S1210). In contrast, when the driver approves transmission, the selected message may be transmitted to the selected transmission object (S1212).

Therefore, the neighboring vehicle, to which the message will be transmitted, may receive and confirm the message selected by the driver (S1213).

Figure 13:
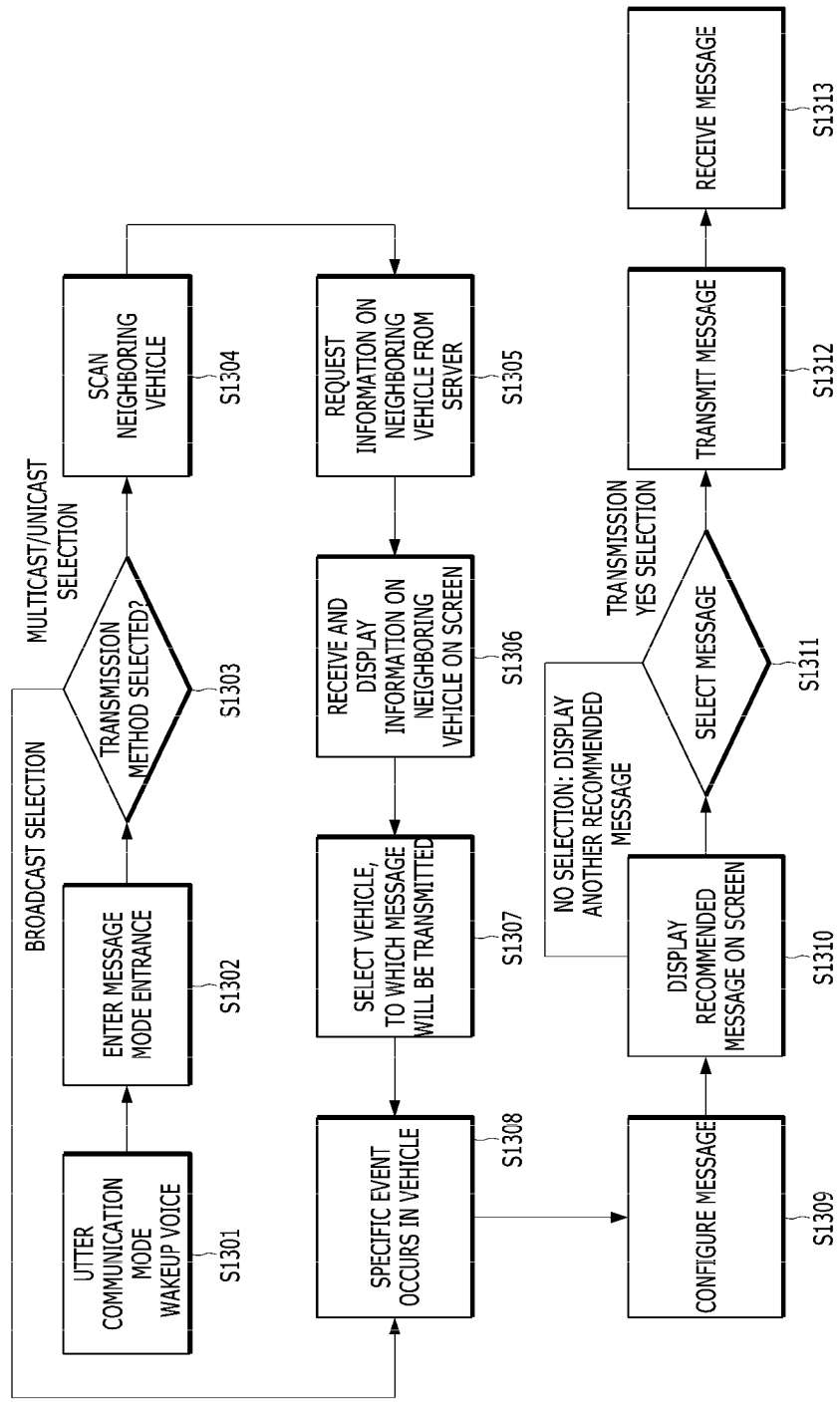
FIG. 13 is a flowchart illustrating an example of a conditional type selective message transmission process according to an exemplary embodiment of the present disclosure.

FIG. 13 is a flowchart illustrating an example of a conditional type selective message transmission process according to an exemplary embodiment of the present disclosure.

Steps S1301 to S1307 of FIG. 13 respectively correspond to steps S1101 to S1107 of FIG. 11 except that the wakeup command of step S1301 is of a conditional type (e.g., "conditional type message") and the message mode is a conditional type message mode in step S1302 and thus a repeated description will be omitted.

When the vehicle, to which the message will be transmitted, is specified, the inter-vehicle communication system 200 may determine whether a specific event (e.g., a left turn indicator light is turned on) occurs in the vehicle through the situation determination learning/inference engine 230 (S1308).

Then, the message recommendation learning/inference engine 243 of the inter-vehicle communication system 200 may infer/determine a message phrase based on the event and determine a recommended message (S1309) and display the recommended message as shown in (d) of FIG. 6 (S1310).

The inter-vehicle communication system 200 may receive, from the user, confirmation as to whether the displayed message is transmitted (S1311), and display another recommended message when the driver rejects transmission. In contrast, when the driver approves transmission, the selected message may be transmitted to the selected transmission object (S1312).

Therefore, the neighboring vehicle, to which the message will be transmitted, may receive and confirm the message selected by the driver (S1313).

Figure 14:
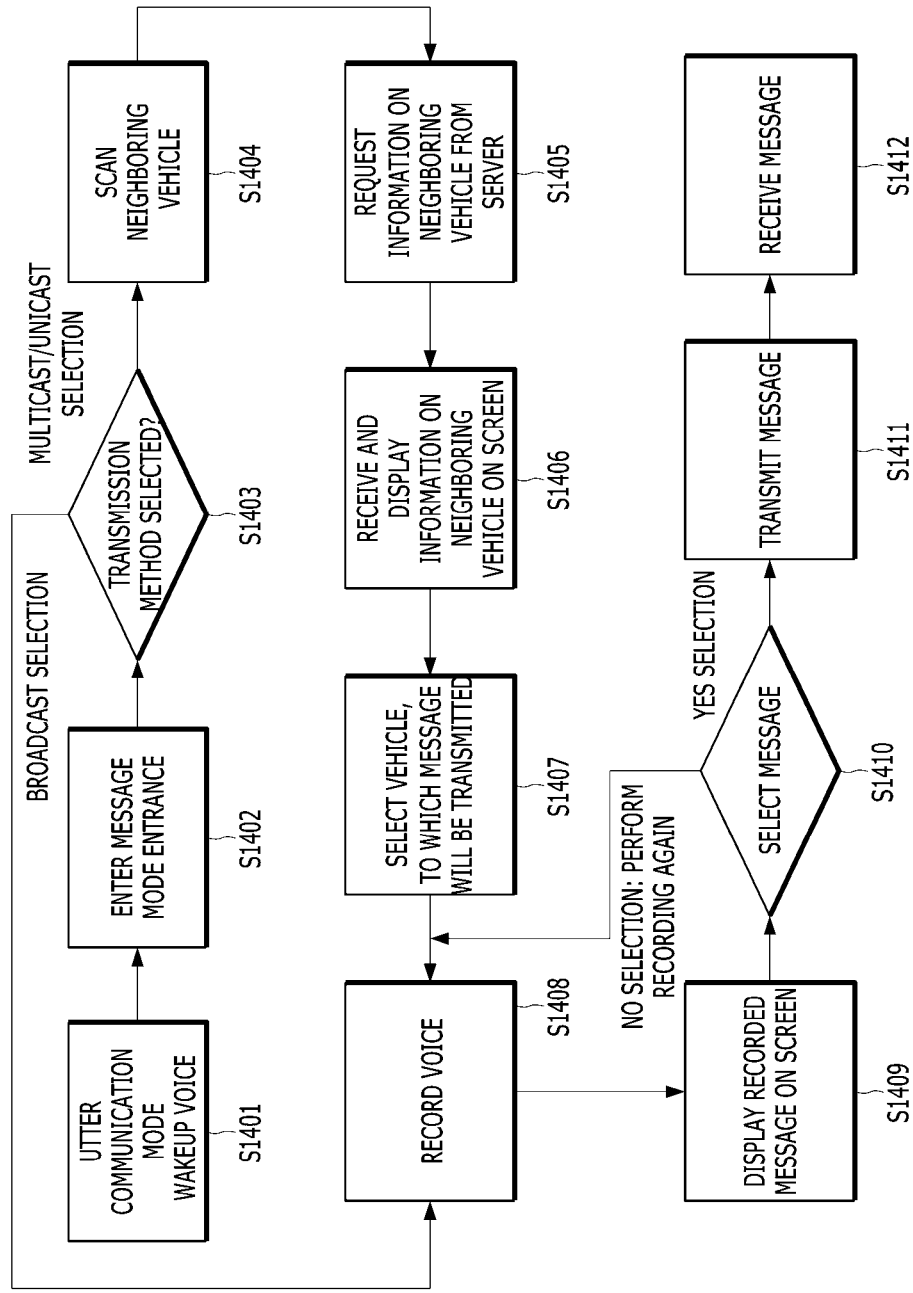
FIG. 14 is a flowchart illustrating a voice type selective message transmission process according to an exemplary embodiment of the present disclosure.

FIG. 14 is a flowchart illustrating a voice type selective message transmission process according to an exemplary embodiment of the present disclosure.

Steps S1401 to S1407 of FIG. 14 respectively correspond to steps S1101 to S1107 of FIG. 11 except that the wakeup command of step S1401 is of a voice type (e.g., "recorded message") and the message mode is a voice-recording type message mode in step S1402 and thus a repeated description will be omitted.

When the vehicle, to which the message will be transmitted, is specified, the inter-vehicle communication system 200 may record the voice of the user through the voice recording module 244 (S1408). Therefore, a message list of a predetermined number of voices including immediately previously recorded voice and existing recorded voices may be displayed as shown in (c) of FIG. 6 (S1409).

The inter-vehicle communication system 200 may receive, from the user, confirmation as to whether the displayed message is transmitted (S1410), and perform recording again when the driver rejects transmission. In contrast, when the driver approves transmission, the selected message may be transmitted to the selected transmission object (S1411).

Therefore, the neighboring vehicle, to which the message will be transmitted, may receive and confirm the message selected by the driver (S1412).

Figure 15:
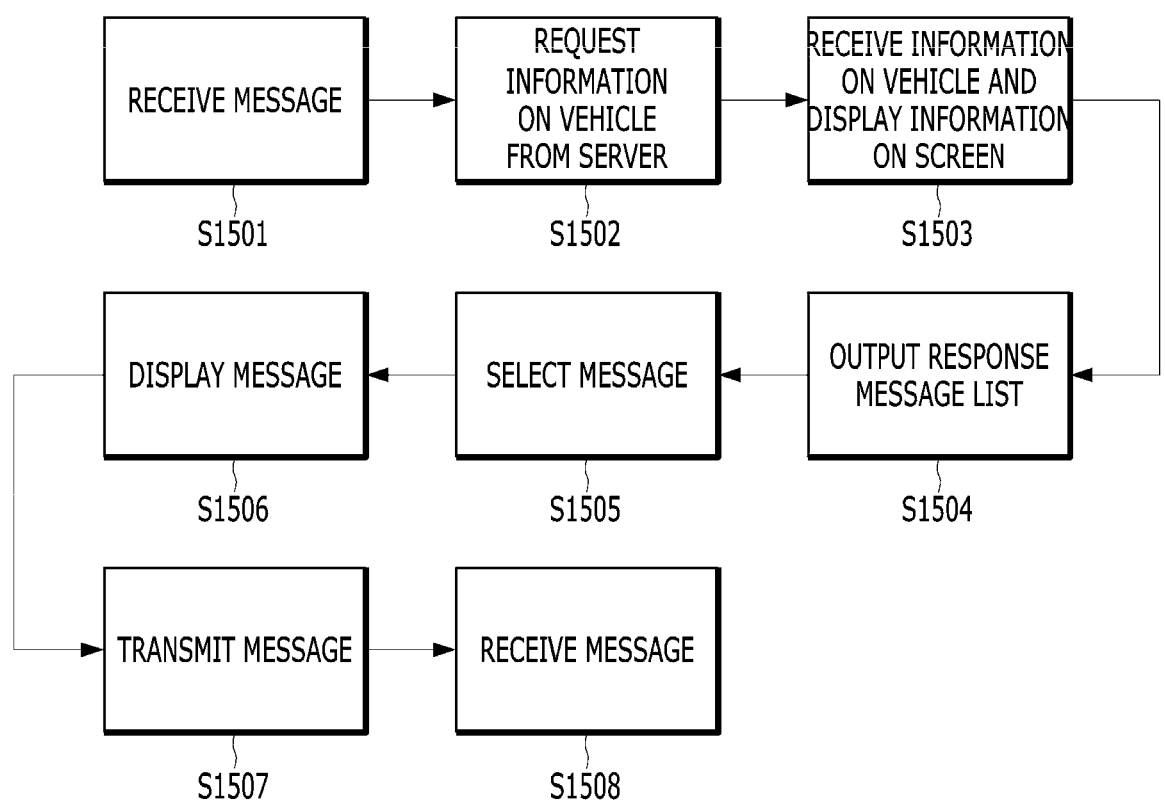
FIG. 15 is a flowchart illustrating a response message transmission process in response to message reception according to an exemplary embodiment of the present disclosure.

FIG. 15 is a flowchart illustrating a response message transmission process in response to message reception according to an exemplary embodiment of the present disclosure.

Referring to FIG. 15, as a message is received from another neighboring vehicle (S1501), the inter-vehicle communication system 200 requests information on the neighboring vehicle, which has transmitted the message, from the server using vehicle identification information included in the message (S1502). At this time, as shown in (b) of FIG. 7, a user interface corresponding to message reception may be output through the information output unit 300.

When vehicle information is received, as shown in (a) of FIG. 5, information on the vehicle, which has transmitted message, may be displayed (S1503), and the content of the message may be displayed as shown in (d) of FIG. 7. When the user selects a reply transmission menu 710, the message recommendation learning/inference engine 243 may output a response message list (e.g., Thank you/Sorry/Go ahead/Go first) suitable for the reply to the received message (S1504).

When the driver selects a message to be transmitted from the response message list (S1505), the full text of the message to be transmitted may be displayed (S1506).

When the driver approves transmission, the selected message may be transmitted to the vehicle, which has transmitted the message, using the unicast method (S1507).

Therefore, the vehicle, which has transmitted the message, may receive and confirm the message selected by the driver (S1508).

FIGS. 16A-16F are views showing an example of a situation in which a keyword type selective message according to an exemplary embodiment of the present disclosure is transmitted.

Referring to FIG. 16A, a situation in which a subject vehicle 1610 and another vehicle 1620 approach each other on a narrow road is illustrated.

At this time, as shown in FIG. 16B, when the driver of the subject vehicle 160 utters a wakeup command "keyword type message" and then utters a "predetermined neighboring vehicle", the inter-vehicle communication system 200 may determine that the driver desires to transmit a message using a multicast or unicast method.

Therefore, as shown in FIG. 16C, the inter-vehicle communication system 200 of the subject vehicle 1610 acquires the identification information of the neighboring vehicle and queries the server 1630 about the identification information.

As shown in FIG. 16D, the information on the neighboring vehicle is output on the display 330, the driver selects the other vehicle 1620 in front and utters a keyword "stop" as shown in FIG. 16E. Therefore, the message recommendation learning/inference engine 243 outputs a message list corresponding to the keyword and the driver may select and transmit a message "Because I will stop by the side, please go ahead". The message is transmitted to the other vehicle 1620 as shown in FIG. 16F and the driver may move the vehicle to the edge of the road. The other vehicle 1620 may transmit a thank you message in response thereto using the method described with reference to FIG. 15.

The vehicle according to at least one embodiment of the present disclosure can conveniently transmit a message to drivers of neighboring vehicles.

In particular, it is possible to conveniently select the form and content of a message suitable for a situation and a transmission object and to automatically transmit a suitable message to neighboring vehicles according to the driver or vehicle situation.

The effects of the present disclosure are not limited to the above-described effects and other effects which are not described herein may be derived by those skilled in the art from the above description of the embodiments of the present disclosure.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of controlling an inter-vehicle communication system, the method comprising:
    monitoring a current situation based on at least one piece of input information;
    determining whether the current situation corresponds to an emergency condition;
    preparing a first message corresponding to the emergency condition upon determining that the current situation corresponds to the emergency condition; and
    broadcasting the first message to at least one neighboring vehicle,
    wherein the determining includes determining an emergency level corresponding to the emergency condition among a plurality of predetermined emergency levels, and
    wherein the broadcasting includes determining whether a driver confirms the first message before transmission according to the determined emergency level.

2. The method according to claim 1, wherein the current situation includes a driver state and a vehicle state.

3. The method according to claim 1, further comprising waiting for an input of a wakeup command upon determining that the current situation does not correspond to the emergency condition,
    wherein the wakeup command corresponds to each of a plurality of types of a selective message.

4. The method according to claim 3, further comprising:
    receiving the wakeup command;
    receiving a transmission method selected by the driver; and
    acquiring information on the at least one neighboring vehicle when the selected transmission method is a unicasting or multicasting method.

5. The method according to claim 4, wherein the acquiring includes:
    acquiring vehicle identification information from the at least one neighboring vehicle;
    querying a server about the acquired vehicle identification information; and
    acquiring information on a neighboring vehicle corresponding to the vehicle identification information from the server, and
    wherein the information on the neighboring vehicle includes at least one of a vehicle number, a vehicle type, a driver state, or a vehicle state of the at least one neighboring vehicle.

6. The method according to claim 4, further comprising:
    displaying the acquired information on the at least one neighboring vehicle; and
    selecting at least one vehicle, to which a second message will be transmitted, from the displayed information on the neighboring vehicle.

7. The method according to claim 6, further comprising, when the at least one vehicle, to which the second message will be transmitted, is selected,
    preparing the second message corresponding to the wakeup command among the plurality of types of the selective message; and
    transmitting the second message to the at least one vehicle, to which the second message will be transmitted, based on the acquired information on the neighboring vehicle.

8. The method according to claim 3, wherein the plurality of types of the selective message includes two or more of:
    a fixed type in which any one of prestored messages is selected;
    a keyword type in which any one of messages recommended based on a keyword uttered by the driver is selected;
    a conditional type in which any one of messages recommended based on a vehicle state is selected; and
    a voice recording type transmitted based on voice recording of the driver.

9. A non-transitory computer-readable recording medium having recorded thereon a program for executing the method according to claim 1.

10. A vehicle comprising:
    an information input unit configured to acquire at least one piece of input image; and
    an inter-vehicle communication system configured to:
    monitor a current situation based on the at least one piece of input information,
    determine whether the current situation corresponds to an emergency condition,
    prepare a first message corresponding to the emergency condition upon determining that the current situation corresponds to the emergency condition, and
    broadcast the first message to at least one neighboring vehicle,
    wherein the inter-vehicle communication system determines an emergency level corresponding to the emergency condition among a plurality of predetermined emergency levels, and determines whether a driver confirms the first message before transmission according to the determined emergency level.

11. The vehicle according to claim 10, wherein the current situation includes a driver state and a vehicle state.

12. The vehicle according to claim 10, wherein the inter-vehicle communication system waits for an input of a wakeup command upon determining that the current situation does not correspond to the emergency condition, and wherein the wakeup command corresponds to each of a plurality of types of a selective message.

13. The vehicle according to claim 12, wherein the inter-vehicle communication system receives the wakeup command, receives a transmission method selected by the driver, and acquires information on the at least one neighboring vehicle when the selected transmission method is a unicasting or multicasting method.

14. The vehicle according to claim 13, wherein the inter-vehicle communication system acquires vehicle identification information from the at least one neighboring vehicle, queries a server about the acquired vehicle identification information, and acquires information on a neighboring vehicle corresponding to the vehicle identification information from the server, and wherein the information on the neighboring vehicle includes at least one of a vehicle number, a vehicle type, a driver state, or a vehicle state of the at least one neighboring vehicle.

15. The vehicle according to claim 13, further comprising:
an information output unit configured to display the acquired information on the at least one neighboring vehicle and to select at least one vehicle to which a second message will be transmitted from the displayed information on the neighboring vehicle.

16. The vehicle according to claim 15, wherein, when the at least one vehicle, to which the second message will be transmitted, is selected, the inter-vehicle communication system prepares the second message corresponding to the wakeup command among the plurality of types of the selective message and transmits the second message to the at least one vehicle to which the second message will be transmitted based on the acquired information on the neighboring vehicle.

17. The vehicle according to claim 12, wherein the plurality of types of the selective message includes two or more of:

a fixed type in which any one of prestored messages is selected;

a keyword type in which any one of messages recommended based on a keyword uttered by the driver is selected;

a conditional type in which any one of messages recommended based on a vehicle state is selected; and a voice recording type transmitted based on voice recording of the driver.

* * * * *